United States Patent
Ando et al.

[15] 3,652,132
[45] Mar. 28, 1972

[54] ANTISKID CONTROL SYSTEM

[72] Inventors: Noriyoshi Ando, Kariya-shi; Atutoshi Okamoto, Toyohashi-shi; Koichi Taniguchi, Kariya-shi; Yoshiaki Nakano, Gifu-shi; Koichi Tokyama, Toyohashi-shi, all of Japan

[73] Assignee: Nippon Denso Kabushiki Kaisha, Kariya-shi, Japan

[22] Filed: Aug. 28, 1969

[21] Appl. No.: 853,745

[30] Foreign Application Priority Data

Sept. 6, 1968 Japan..................................43/64540

[52] U.S. Cl..........................303/21 CG, 188/181 A, 303/20
[51] Int. Cl.............................................................B60t 8/12
[58] Field of Search.................188/181 A; 303/21; 324/162; 340/262

[56] References Cited

UNITED STATES PATENTS

| | | |
|---|---|---|
| 3,441,320 | 4/1969 | Flory.....................................188/181 |
| 3,511,542 | 5/1970 | Fielek, Jr...............................188/181 |
| 3,512,844 | 5/1970 | Stelzer.....................................303/21 |
| 3,467,444 | 9/1969 | Leiber..................................303/21 B |
| 3,494,671 | 2/1970 | Slavin et al. ........................303/21 P |
| 3,525,553 | 8/1970 | Carp et al..........................303/21 P |
| 3,556,610 | 1/1971 | Leiber................................303/21 P |
| 3,507,544 | 4/1970 | Wakamatsu et al...............303/21 CG |

*Primary Examiner*—Milton Buchler
*Assistant Examiner*—Stephen G. Kunin
*Attorney*—Cushman, Darby & Cushman

[57] ABSTRACT

An antiskid control system for a vehicle including apparatus for automatically changing a predetermined threshold detection value in a peripheral wheel deceleration detecting apparatus so that a predetermined value for detecting excessive wheel deceleration is changed in accordance with the vehicle deceleration. A brake constant pressure holding apparatus is actuated when the detected wheel deceleration exceeds the predetermined value and if the excessive deceleration signal persists for a given time span, a brake release apparatus is actuated thereby preventing unnecessary brake releases that could be caused by noise signals.

4 Claims, 1 Drawing Figure

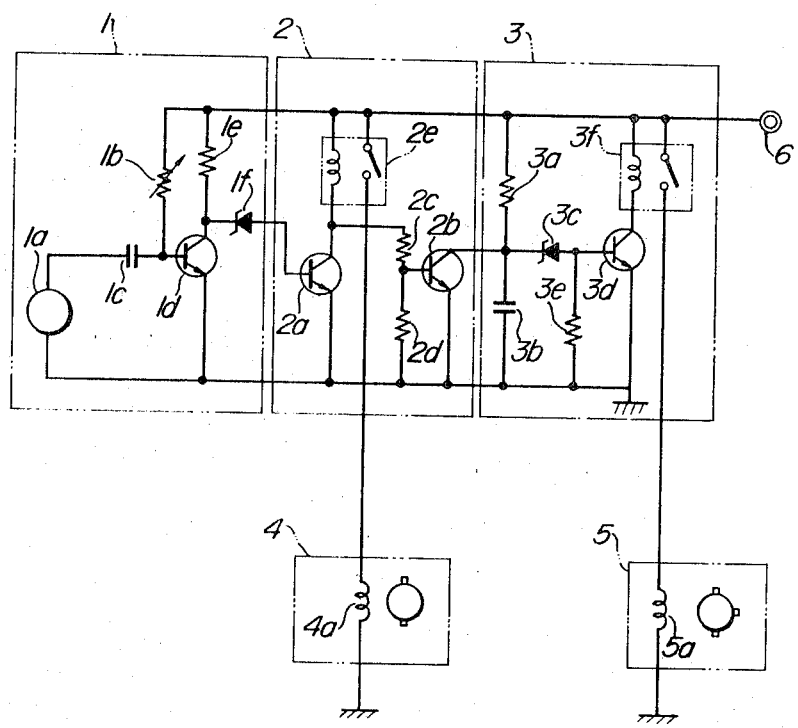

ANTISKID CONTROL SYSTEM

BACKGROUND OF THE INVENTION

1. Field of the Invention

The present invention related to an antiskid control system designed to prevent skidding of passenger carrying vehicles such as an automobile which may be caused by the stopping of rotation of the wheels due to an excessively applied braking force when the brakes are operated.

2. Description of the Prior Art

The prior art systems of this kind have been so constructed that an inertial means was coupled to a wheel axle shaft and a resilient means was interposed between the wheel axle shaft and the inertial means, whereby a change in the relative position of the two means are detected as the angular wheel deceleration which, when a predetermined value was exceeded, would energize a braking force releasing solenoid valve or a hydraulic pressure actuator through a contact mechanism mounted on the inertial means to release the braking force, thus preventing skidding of the vehicle due to rapid stopping of the rotation of the wheels.

With the conventional devices described above, however, it was impossible to perfectly prevent the wheels from ceasing rapid rotation on roads where the coefficients of friction was low such as on a snowy frozen road surface because there was a delay between the energization and operation of the braking system. Of course, stopping the rotation of the wheel on a snowy frozen road surface etc., may be avoided if the predetermined value of angular wheel deceleration is set to a lower level. From an opposite point of view, however, this involves a problem wherein if the antiskid control operation is effective on a road where the coefficient of road friction is as high as on a dry asphalt road surface etc., the stopping distance or the distance travelled from the time the antiskid control operation is effected until the vehicle is brought to a complete standstill will be considerably increased. There is another drawback wherein because randomly varying revolutions take place in the wheel rotation even under normal driving conditions, such variations in the revolution inevitably produce an effect when the angular wheel deceleration is to be detected so that notwithstanding the angular wheel deceleration is still at a value which is below the predetermined value, a number of signals may be produced intermittently which energize a braking force releasing solenoid valve or a hydraulic pressure actuator to release the braking force. Thus, if these signals are permitted to energize the braking force releasing solenoid valve or hydraulic pressure actuator, the braking force will be reduced to an excessively low level causing the vehicle to run freely, and this is a very dangerous situation. To eliminate these drawbacks, if the moment of inertia of inertial means is increased and a wheel axle shaft and the inertial means is coupled by a flexible shaft, a time delay will be introduced in the detection of the angular deceleration. In other words, although the angular wheel deceleration developed in the wheel has reached the predetermined value, a contact mechanism mounted on the inertial means will not close until after the lapse of a predetermined time so that there is a drawback that the beginning of the energization of the solenoid valve will be delayed for a time. There is still a further drawback wherein it often happens that the flexible shaft connecting the wheel axle shaft and the inertial means may be damaged due to the rapid changes in the rotation of the wheel axle shaft.

SUMMARY OF THE INVENTION

In order to eliminate the drawbacks of this type of system known to the prior art, the present invention has for its object the provision of an antiskid control system comprising peripheral wheel deceleration detecting means adapted to produce a signal when the peripheral wheel deceleration exceeds a predetermined value, braking constant pressure holding means adapted to be actuated by the output signal from the said deceleration detection means to counteract a rise in the braking pressure, and braking pressure release control means adapted to be actuated when the output signal from the said deceleration detecting means continued in excess of a predetermined time to operate in a manner designed to release the braking pressure such that the occurrence of an excessively low braking force condition due to signals developed by the random variations in the rotation of the wheel is prevented, and further predetermined value changeover variable means is disposed in the said deceleration detecting means to change the predetermined value for the said deceleration detecting means in accordance with the rate of deceleration of the vehicle, whereby the vehicle is equally braked and stopped with a proper braking force at all times and under different conditions where the coefficients of road friction differ considerably.

According to the present invention greater effectiveness is achieved because the system according to the present invention comprises, as described above, peripheral wheel deceleration detecting means adapted to produce a signal when the peripheral wheel deceleration exceeds a predetermined value, braking pressure discontinuing means adapted to be actuated by the output signal from the said deceleration detecting means to stop a rise in the braking pressure, and braking pressure control means adapted to be actuated when the output signal from the said deceleration detecting means continues in excess of a predetermined time to operate in a manner designed to release the braking pressure, the instant the peripheral wheel deceleration reaches the predetermined value due to random variations in the rotation of the wheel, any rise in the braking pressure is stopped by the said braking pressure discontinuing means, the instant the peripheral wheel deceleration drops below the predetermined value the braking pressure is increased again, and only when the peripheral wheel deceleration that has reached the predetermined value is further continued in excess of a predetermined time the said braking pressure control means is energized to operate in a manner designed to release the braking pressure, whereby there is no danger that the vehicle runs free under an excessively low braking pressure condition. Moreover, the system according to the present invention is especially useful in that since the deceleration detecting means is provided with predetermined value changeover variable means adapted to change the predetermined value for the deceleration detecting means, the system is equally effective in preventing the vehicle from skidding under an excessively high braking pressure on roads ranging from a snowy frozen road surface where the coefficient of friction is low to a dry asphalt road surface where the coefficient of friction is high.

BRIEF DESCRIPTION OF THE DRAWING

The accompanying drawing is a wiring diagram showing an embodiment of the antiskid control system according to the present invention.

DESCRIPTION OF THE PREFERRED EMBODIMENT

The present invention will be explained hereinafter in conjunction with the illustrated embodiment. In the drawing, numeral 1 designates a peripheral wheel deceleration detecting means and 1a designates a generator coupled to a wheel axle shaft to develop a voltage proportional to the peripheral wheel speed. Numeral 1b designates a variable resistor which forms a predetermined value changeover variable means and whose ohmic value is proportionated to the rate of deceleration of the vehicle and whose specific construction may be of any conventional form as will be apparent to those in the art. Numeral 1c designates a capacitor forming with the variable resistor 1b a diffentiation circuit which in turn detects the peripheral wheel deceleration which is the differentiation of the generated voltage of the generator 1a or the time derivative of the peripheral wheel speed. This diffentiation circuit determines the predetermined value at which a certain peripheral wheel deceleration is detected and the said predetermined value changes in accordance with a change in the ohmic value of the variable resistor $1b$. Numeral $1d$ designates a transistor; $1e$ a load resistor of the transistor $1d$; $1f$ a breakdown diode. Numeral 2 designates a switching circuit; $2a$ and $2b$, transistors; $2c$ and $2d$, bias resistors of the transistor $2b$; $2e$ a relay. Numeral 3 designates a time delay circuit; $3a$ a resistor; $3b$ a capacitor; $3c$ a breakdown diode, the required time delay being determined by these three elements. Numeral $3d$ designates a transistor; $3e$ a bias resistor of the transistor $3d$; $3f$ a relay. Numeral 4 designates a braking pressure discontinuing means; $4a$ an exciting coil which when energized causes the means 4 to stop a rise in the braking pressure. Numeral 5 designates a braking pressure control means having an exciting coil $5a$, the energization of which causes the control means to operate in a manner designed to reduce the braking pressure. Numeral 6 designates a terminal connected to a positive terminal of a battery (not shown) installed in the vehicle.

With the construction described above, the operation of the system according to the present invention will be explained hereinafter. In the normal running state of the vehicle, the generator $1a$ generates a voltage in proportion to the rotational speed of the wheel axle shaft, such that the upper side of the generator as viewed in the drawing becomes plus and the lower side thereof becomes minus, and the current thus generated flows from said generator $1a$ through the capacitor $1c$ and the base-emitter circuit of the transistor $1d$, thus charging said capacitor $1c$ so that the left side thereof as viewed in the drawing becomes plus and the right side minus. The transistor $1d$ is in a conductive state with its base current supplied through the variable resistor $1b$ from the terminal 6, and the potential at the collector thereof is substantially zero. Therefore, the breakdown diode $1f$ is held deenergized, supplying no current to the base of the transistor $2a$. In braking the vehicle, when the voltage generated by the generator $1a$ becomes substantially zero, a current flows from the terminal 6 to the ground through the differentiation circuit composed of the resistor $1b$ and the capacitor $1c$ and no current flows through the base-emitter circuit of the transistor $1d$. Therefore, the transistor $1d$ is cut off and the potential of the collector of said transistor $1d$ rises, so that the breakdown diode $1f$ is energized to supply a current to the base of the transistor $2a$. If the resistance value of the resistor $1b$ is large, the base current of the transistor $1b$ supplied through said resistor $1b$ is small in the normal condition, so that the transistor $1d$ tends to be cut off due to the wheel deceleration, even if the rate of voltage reduction of the generator $1a$ is relatively small. This shows that the set value of the peripheral wheel deceleration detecting means 1 is small. Conversely, if the resistance value of the resistor $1b$ is small, said set value is large. When the brake pedal is pressed by the driver to apply the brakes to the vehicle on a road where the coefficient of friction is low, such as on a snowy frozen road surface, vehicle deceleration is developed as the braking pressure builds up and this vehicle deceleration gradually increases. At the same time, the peripheral wheel deceleration is also increased due to the increased braking pressure. After that, the vehicle deceleration reaches a maximum value which is determined by the coefficient of road friction. If the braking pressure continues to increase further, the peripheral wheel deceleration increases suddenly, whereas the vehicle deceleration changes to a somewhat lower value, although the degree of this change is very small. On the other hand, the maximum value of vehicle deceleration is relatively small on a road surface such as, for example, a snowy frozen road surface, and therefore the ohmic value of the variable resistor $1b$ and consequently the predetermined value which is determined by the variable resistor $1b$ and the capacitor $1c$ is small. Then, because the peripheral wheel deceleration increases as the coefficient of friction decreases, the peripheral wheel deceleration may readily reach the aforesaid predetermined value, whereupon the exciting coil $4a$ of the braking pressure discontinuing means 4 will be energized through the switching circuit 2 thereby stopping a rise in the braking pressure, irrespective of the driver's will. Under this state, if the peripheral wheel deceleration which exceeds the predetermined value continues in excess of a preset time, the exciting coil $5a$ of the braking pressure control means 5 is energized to operate in a manner designed to release the braking pressure. In this case, as long as the peripheral wheel deceleration is not permitted to continuously exceed the predetermined value more than the preset time by virtue of stopping the rise in the braking pressure, the exciting coil $5a$ of the braking pressure control means 5 will not be energized, whereas if the peripheral wheel deceleration decreases below the predetermined value, the exciting coil $4a$ of the braking pressure discontinuing means 4 will be deenergized to increase the braking pressure. As described above, the braking pressure will be controlled by the braking pressure discontinuing means 4 when the peripheral wheel deceleration does not continuously occur in excess of the preset time; it will be controlled by the braking pressure control means 5 when the peripheral wheel deceleration continuously occurs in excess of the preset time; and both the braking pressure discontinuing means 4 and the braking pressure control means 5 will not be energized to increase the braking pressure when the peripheral wheel deceleration decreases below the predetermined value. By repeating this process of operations until the vehicle is brought to a standstill, the vehicle may be stopped while preventing the violent stoppage of the rotation of the wheels. In this case, any signals that may be produced by random variations in the rotation of the wheel merely causes the braking pressure discontinuing means 4 to go on and off and since the time delay circuit 3 is designed such that it prevents these signals from energizing the braking pressure control means 5, the vehicle will never be allowed to run free. The operation of the present system when the brakes are applied on a road where the coefficient of friction is considerably high such as on a dry asphalt road surface will be explained hereinafter. As previously explained, the increased braking pressure results in an increase in the vehicle deceleration and the predetermined value increases. In this case, the peripheral wheel deceleration also increases as the braking pressure increase. The vehicle deceleration then reaches the maximum value determined by the coefficient of road friction which will be, as a matter of course, of a value several times as large as the said maximum value of the vehicle deceleration on a snowy frozen road surface. Therefore, the predetermined value previously set by the variable resistor $1b$ and the capacitor $1c$ assumes a larger value. Then, if the braking pressure continues to increase, the peripheral wheel deceleration exceeds the predetermined value to energize the braking pressure discontinuing means 4, and when the peripheral wheel deceleration continues to exceed the predetermined value by more than the preset time, the braking pressure control means 5 is energized to operate in a manner designed to release the braking pressure. Thereafter, the vehicle will be brought to a complete standstill in the same manner described with respect to the above snowy frozen road surface. In this case, only the braking pressure discontinuing means 4 will be energized when the peripheral wheel deceleration is exceeded for short periods of time intermittently due to the random variations in the wheel rotation, and the braking pressure control means 5 will be energized to release the braking pressure only when the peripheral wheel deceleration continues to exceed the predetermined value by more than the preset time, in the same manner as is the case for a snowy frozen road surface.

We claim:

1. An improved antiskid control system for controlling the applied braking force of a vehicle to prevent skidding and wherein transient noise signals are effectively prevented from completely releasing the braking force, said system comprising:

wheel deceleration detecting means for producing an output signal when vehicle wheel deceleration exceeds a predetermined value, brake pressure holding means for substantially holding the applied braking force constant, means connected to said deceleration detecting means for actuating said holding means whenever said output signal is produced, brake release means for substantially releasing said applied braking force, and further means connected to said first-mentioned means including an effective time delay means for actuating said brake release means only if said output signal persists for a given time period thereby preventing unwanted actuation of said release means by transient noise signals.

2. An antiskid control system as in claim 1 wherein said wheel deceleration detecting means comprises:

a wheel speed generator for producing an electrical speed signal proportional to peripheral vehicle wheel speed, a differentiation circuit connected to the output of said wheel speed generator for producing a derivative signal proportional to the time derivative of said speed signal, and level detecting means for detecting a predetermined level of said derivative signal and producing said output signal when vehicle wheel deceleration exceeds a predetermined value, said differentiation circuit comprising at least two impedance elements with the magnitude of at least one of said impedance elements being proportioned to the rate of vehicle deceleration whereby said predetermined value changes in accordance with said proportioned changes in the magnitude of said at least one impedance element.

3. An antiskid control system as in claim 1 wherein said means connected to said deceleration detecting means for actuating said holding means comprises:

a transistor switching circuit connected to switch energizing current to a relay coil in response to said output signal, controlled contacts of said rely coil being connected, in turn, to apply energizing current to an electromagnetic control coil in said brake pressure holding value, and a further transistor amplifier for inverting said output signal and providing an inverted output signal.

4. An antiskid control system as in claim 3 wherein said further means comprises:

a series R-C time delay circuit having its central node connected to receive said inverted output signal and also connected through a breakdown diode to a further inverting transistor amplifier input, the voltage on the capacitor in said R-C time delay circuit changing in response to said inverted output signal and activating an output relay coil connected in the output of said further inverting transistor amplifier in response to the voltage across said capacitor reaching a predetermined level as determined by said breakdown diode, controlled contacts of said output relay being connected to supply energizing current to an electromagnet control coil in said brake release means.

* * * * *